United States Patent
Seong

(10) Patent No.: US 10,312,478 B2
(45) Date of Patent: Jun. 4, 2019

(54) BATTERY PACK

(71) Applicant: Samsung SDI Co., Ltd., Yongin-si, Gyeonggi-do (KR)

(72) Inventor: Jae-Il Seong, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/605,145

(22) Filed: Jan. 26, 2015

(65) Prior Publication Data

US 2015/0303410 A1    Oct. 22, 2015

(30) Foreign Application Priority Data

Apr. 16, 2014   (KR) .................. 10-2014-0045356

(51) Int. Cl.
| | | |
|---|---|---|
| H01M 2/02 | (2006.01) | |
| H01M 2/04 | (2006.01) | |
| H01M 10/04 | (2006.01) | |
| H01M 2/30 | (2006.01) | |

(52) U.S. Cl.
CPC ....... *H01M 2/0202* (2013.01); *H01M 2/0404* (2013.01); *H01M 2/0456* (2013.01); *H01M 2/30* (2013.01); *H01M 2002/0205* (2013.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 5,198,313 | A * | 3/1993 | Juergens | H01M 2/26 29/623.5 |
| 6,020,086 | A * | 2/2000 | Van Lerberghe | H01M 2/0207 429/127 |
| 2004/0131932 | A1* | 7/2004 | Hamada | H01M 2/0202 429/175 |
| 2005/0130030 | A1* | 6/2005 | Watanabe | H01M 2/1061 429/100 |
| 2006/0040178 | A1* | 2/2006 | Probst | A61N 1/375 429/176 |
| 2008/0003498 | A1 | 1/2008 | Yasuda et al. | |

(Continued)

FOREIGN PATENT DOCUMENTS

| | | | | |
|---|---|---|---|---|
| EP | 0928035 | * | 7/1999 | H01M 10/04 |
| JP | 2002-245975 A | | 8/2002 | |

(Continued)

OTHER PUBLICATIONS

U.S. Non-Final Office Action dated Mar. 11, 2016 for U.S. Appl. No. 14/605,172.

(Continued)

*Primary Examiner* — Yoshitoshi Takeuchi
(74) *Attorney, Agent, or Firm* — Knobbe Martens Olson & Bear LLP

(57) ABSTRACT

A battery pack is disclosed. In one aspect, the battery pack includes an electrode assembly and a case accommodating the electrode assembly, wherein the case includes first and second walls facing each other and respectively concave and convex with respect to the electrode assembly. The battery pack also includes an uneven portion formed on the second wall.

15 Claims, 3 Drawing Sheets

(56) References Cited

U.S. PATENT DOCUMENTS

| | | | |
|---|---|---|---|
| 2010/0227215 A1* | 9/2010 | Cheon | ............... H01M 2/0232 |
| | | | 429/178 |
| 2011/0014516 A1 | 1/2011 | Roh et al. | |
| 2011/0097615 A1 | 4/2011 | Goh et al. | |
| 2012/0183825 A1 | 7/2012 | Lee et al. | |

FOREIGN PATENT DOCUMENTS

| | | |
|---|---|---|
| KR | 10-2009-0097731 A | 9/2009 |
| KR | 10-2010-0025968 A | 3/2010 |
| KR | 10-2011-0006524 A | 1/2011 |
| KR | 10-2012-0082808 A | 7/2012 |

OTHER PUBLICATIONS

U.S. Final Office Action dated Sep. 22, 2016 for U.S. Appl. No. 14/605,172.

U.S. Non-Final Office Action dated Jan. 10, 2017 for U.S. Appl. No. 14/605,172.

\* cited by examiner

BATTERY PACK

INCORPORATION BY REFERENCE TO ANY PRIORITY APPLICATIONS

This application claims the benefit of Korean Patent Application No. 10-2014-0045356, filed on Apr. 16, 2014, in the Korean Intellectual Property Office, the disclosure of which is incorporated herein in its entirety by reference.

This application relates to U.S. patent application Ser. No. 14/605,172 entitled "Battery Pack", which is concurrently filed as this application and incorporated herein by reference in their entirety.

BACKGROUND

Field

The described technology generally relates to battery packs.

Description of the Related Technology

Due to the development of wireless Internet or communication technologies, use of portable electronic appliances that operate using a battery, instead of being used at fixed locations, has become common. Thus, the markets for various electronic appliances such as mobile phones, game consoles, portable multimedia players (PMP), MPEG audio layer-3 (MP3) players, smartphones, smart pads, electronic book terminals, flexible tablet computers, and wearable medical equipment have grown remarkably.

Among these devices, mobile computers are compact and easy to carry, and thus, are widely used for work or personal purposes at fixed locations or when traveling. To this end, mobile computers generally include a battery pack as a power supply device. A typical battery pack includes a plurality of unit batteries that can be repeatedly charged and discharged in order to provide a sufficient power output.

As the market for mobile electronic appliances has expanded, various types of mobile electronic appliances are provided according to users' needs. Thus, requirements for battery packs suitable for the many types of mobile electronic appliances have also increased. In particular, as users have become interested in curved mobile electronic appliances, requests for curved battery packs have increased.

SUMMARY OF CERTAIN INVENTIVE ASPECTS

One inventive aspect is a battery pack structure.

Another aspect is a battery pack which includes: a case having an opening at one end, a first main wall that is concave, and a second main wall that is convex and faces the first main wall; an electrode assembly accommodated in the case; and an uneven portion formed on the second main wall.

The first main wall and the second main wall may be curved to respectively have a predetermined radius of curvature.

The uneven portion may be formed in a center portion of the second main wall.

A plurality of uneven portions may be formed on the second main wall.

The plurality of uneven portions may be symmetrically formed with respect to the center portion of the second main wall.

The uneven portion may inwardly protrude from the outside to the inside of the second main wall.

The uneven portion may be formed in a lengthwise direction of the case.

The thickness of a center portion of the second main wall may be smaller than a thickness of a center portion of the first main wall.

The uneven portion formed in the second main wall may extend in a width direction of the case.

The uneven portion may protrude into the case.

The predetermined radius of curvature of the second main wall may be greater than the predetermined radius of curvature of the first main wall.

The predetermined radius of curvature of the second main wall may be about 200 mm or greater.

The difference between the predetermined radius of curvature of the first main wall and the predetermined radius of curvature of the second main wall may be from about 10 mm to about 30 mm.

The electrode assembly may be curved along the first main wall and the second main wall.

The battery pack may further include: a cap plate that seals the opening of the case; and an electrode pin that is disposed on an upper surface of the cap plate and is electrically connected to the electrode assembly.

The electrode pin may have a first polarity, and the cap plate may have a second polarity that is different from the first polarity.

The cap plate may include a first side corresponding to the first main wall and a second side corresponding to the second main wall, wherein the first side of the cap plate has same radius of curvature as the first main wall, and the second side of the cap plate has same radius of curvature as the second main wall.

Another aspect is a battery pack which includes: a case having an opening at one end, a first main wall that is concave, and a second main wall that is convex and faces the first main wall, wherein the first main wall and the second main wall are curved to have respectively have a predetermined curvature; an electrode assembly accommodated in the case; a cap plate that seals the opening of the case; and an uneven portion that is formed in a center portion of the second main wall in a lengthwise direction of the case.

The uneven portion formed in the second main wall may extend in a width direction of the case. The uneven portion may protrude into the case.

Another aspect is a battery pack comprising: an electrode assembly; a case accommodating the electrode assembly, wherein the case includes first and second walls opposing each other and respectively concavely and convexly shaped with respect to the electrode assembly; and an uneven portion formed on the second wall.

In the above battery pack, each of the first and second walls has a predetermined radius of curvature. In the above battery pack, the uneven portion is formed in a substantially center portion of the second wall. In the above battery pack, the uneven portion comprises at least one protrusion and at least one recess alternately formed with respect to each other. In the above battery pack, the uneven portions are substantially symmetrical with respect to the center portion of the second wall. In the above battery pack, at least part of the uneven portion extends toward the electrode assembly. In the above battery pack, the uneven portion is formed in a lengthwise direction of the case. In the above battery pack, the thickness of a center portion of the second wall is less than the thickness of a center portion of the first wall.

In the above battery pack, the uneven portion extends in a width direction of the case. In the above battery pack, the predetermined radius of curvature of the second wall is greater than the predetermined radius of curvature of the first wall. In the above battery pack, the predetermined radius of curvature of the second wall is about 200 mm or greater. In the above battery pack, the difference between the predetermined radius of curvature of the first wall and the predetermined radius of curvature of the second wall is in the range from about 10 mm to about 30 mm. In the above battery pack, the electrode assembly is curved along the first and second walls.

The above battery pack further comprises: a cap plate substantially sealing the electrode assembly inside the case; and an electrode pin located on an upper surface of the cap plate and electrically connected to the electrode assembly. In the above battery pack, the electrode pin has a first polarity, and wherein the cap plate has a second polarity that is different from the first polarity. In the above battery pack, the cap plate comprises a first side corresponding to the first wall and a second side corresponding to the second wall, wherein the first side of the cap plate has substantially the same radius of curvature as the first wall, and wherein the second side of the cap plate has substantially the same radius of curvature as the second wall.

Another aspect is a battery pack comprising: an electrode assembly; a case accommodating the electrode assembly, wherein the case includes first and second walls opposing each other, wherein the first wall is curved toward the electrode assembly, wherein the second wall is curved away from the electrode assembly, and wherein the case has a length and a width less than the length; a cap plate substantially sealing the electrode assembly inside the case; and an uneven portion formed in a substantially center portion of the second wall along the direction of the length of the case. In the above battery pack, the uneven portion extends in the direction of the width of the case. In the above battery pack, at least part of the uneven portion extends toward the electrode assembly.

Another aspect is a battery pack comprising: an electrode assembly; and a case accommodating the electrode assembly, wherein the case includes first and second walls opposing each other, wherein the first wall is curved toward the electrode assembly, wherein the second wall is curved away from the electrode assembly, wherein the case has a length and a width less than the length, and wherein the second wall includes an uneven portion formed along the direction of the length of the case.

DETAILED DESCRIPTION OF CERTAIN INVENTIVE EMBODIMENTS

Figure 1:
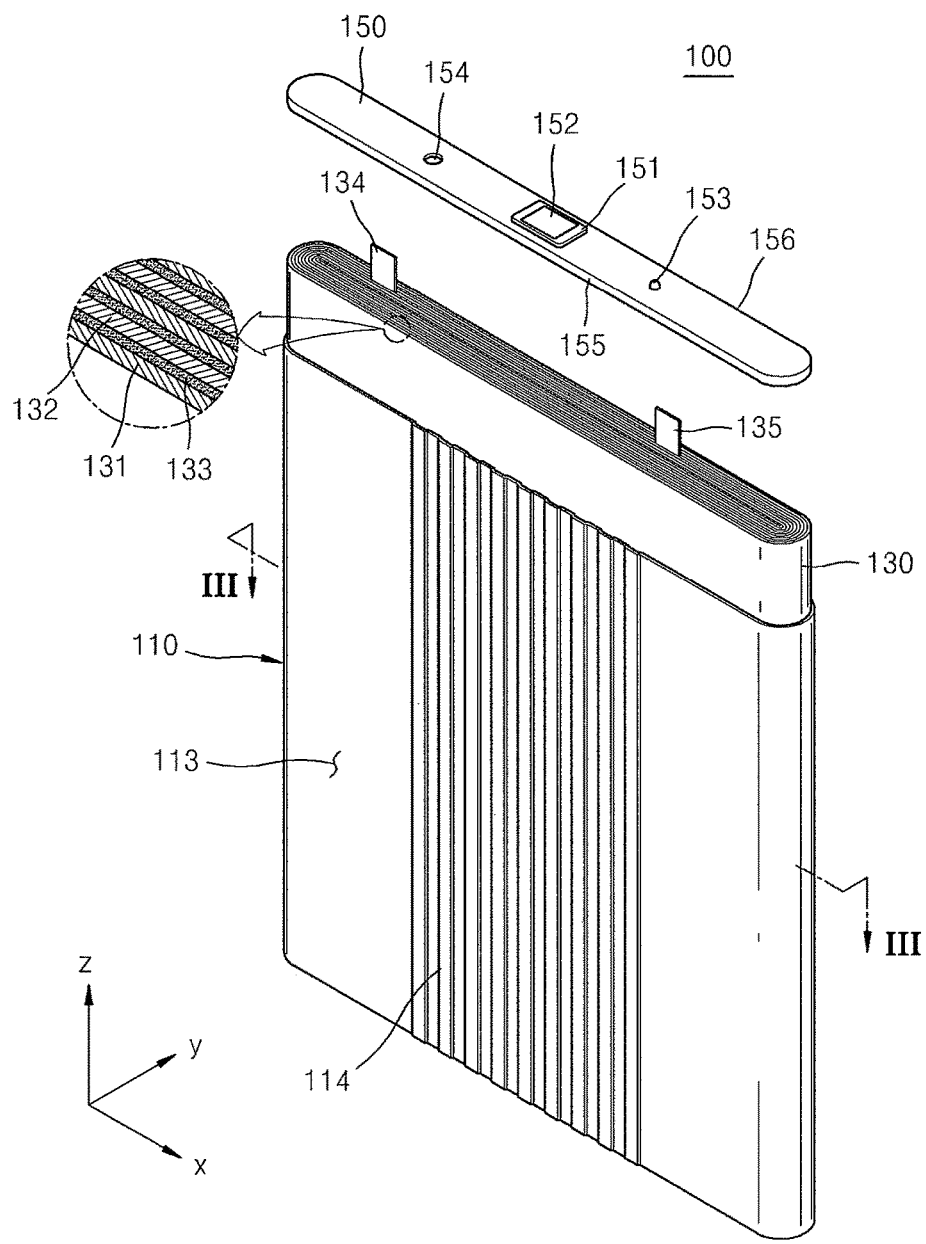
FIG. 1 is a schematic exploded perspective view of a battery pack according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

As the inventive concept allows for various changes and many different forms, particular embodiments will be illustrated in the drawings and described in detail in the written description.

Embodiments will be described below in more detail with reference to the accompanying drawings. Those components that are the same or are in correspondence are rendered the same reference numeral regardless of the figure number, and redundant explanations are omitted.

It will be understood that although the terms "first", "second", etc. may be used herein to describe various components, these components should not be limited by these terms. These components are only used to distinguish one component from another.

Singular expressions, unless defined otherwise in contexts, include plural expressions.

In the embodiments below, it will be further understood that the terms "comprise" and/or "have" used herein specify the presence of stated features or components, but do not preclude the presence or addition of one or more other features or components.

It will also be understood that when an element such as a layer, an area, or a component is referred to as being "on" or "on the top of" another element, it can be directly on or directly on the top of the other element, or intervening layers, areas, or components may also be present. In this disclosure, the term "substantially" includes the meanings of completely, almost completely or to any significant degree under some applications and in accordance with those skilled in the art. Moreover, "formed on" can also mean "formed over."

In the embodiments below, an x-axis, a y-axis, and a z-axis are not limited to three axes on a rectangular coordinates system but may be construed as including these axes. For example, an x-axis, a y-axis, and a z-axis may be at right angles or may also indicate different directions from one another, which are not at right angles.

Also, in the drawings, for convenience of description, sizes of elements may be exaggerated or contracted. In other words, since sizes and thicknesses of components in the drawings are arbitrarily illustrated for convenience of description, the following embodiments are not limited thereto.

Referring to FIG. 1, the battery pack 100 includes a case 110, an electrode assembly 130, a cap plate 150, and an uneven portion 114. The battery pack 100 may be a rechargeable secondary battery such as a lithium-ion battery.

Figure 3:
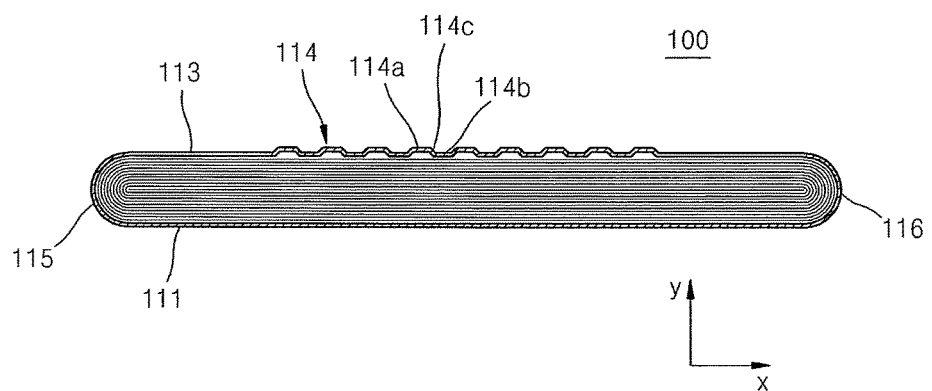
FIG. 3 is a cross-sectional view of the battery pack of FIG. 1 cut along a line III-III.

The case 110 has an opening at one end, and may be partitioned into a first main wall or a first wall 111, a second main wall or a second wall 113 facing the first main wall 111, a first connection wall 115 connecting a first end of the first main wall 111 and a first end of the second main wall 113, and a second connection wall 116 connecting a second end of the first main wall 111 and a second end of the second main wall 113 (see FIG. 3). The case 110 has an opening and inner space that are surrounded by the first main wall 111, the second main wall 113, the first connection wall 115, and the second connection wall 116. The electrode assembly 130 may be inserted through the opening to be accommodated in the inner space of the case 110.

The case 110 may have a substantially hexahedral shape with an opening in an upper portion thereof, and may be formed of a metallic material to provide rigidity to the case 110. For example, the case 110 may be formed of aluminum or an aluminum alloy. After the electrode assembly 130 is inserted into the case 110 through the opening, the opening may be encapsulated by using the cap plate 150. The cap plate 150 may also be formed of aluminum or a metallic material such as an aluminum alloy, like the case 110. The cap plate 150 and the case 110 may be bonded by laser welding to thereby tightly seal the battery pack 100.

The uneven portion 114 may be formed in the second main wall 113 of the case 110. As will be described in detail later, the uneven portion 114 can be formed in the second main wall 113, which has a convex shape, as the first main wall 111 and the second main wall 113 of the case 110 having predetermined curvatures are formed. Although not shown on the drawings, the uneven portion 112 can be formed on both the first and second main walls 111 and 113.

In some embodiments, a plurality of uneven portion 114 may be formed in a center portion of the second main wall 113, and in this case, the uneven portion 114 may be substantially symmetrically formed with respect to the center portion of the second main wall 113. The uneven portion 114 may be formed in a lengthwise direction of the case 110 (Z-axis). While a plurality of uneven portions 114 are formed in the second main wall 113 in FIG. 1, the disclosed embodiments are not limited thereto. According to sizes of the battery packs 100 and 200 and a degree of curvature thereof, one uneven portion 114 may be formed or a plurality of uneven portions 114 may be formed.

The uneven portion 114 may include a convex portion 114a, a concave portion 114b, and a connection portion 114c that are continuously formed. The convex portion 114a and the concave portion 114b may be alternately connected to each other, and the convex portion 114a and the concave portion 114b may be connected via the connection portion 114c.

In some embodiments, the uneven portion 114 includes an uneven structure that is formed by applying a pressure to the second main wall 113. Accordingly, the form of the uneven portion 114 may vary according to a shape of a pressing unit (not shown) of a pressing instrument (not shown). For example, the uneven portion 114 may be curved, round, or polygonal. However, for convenience of description, description below will focus on an uneven structure having a continuous and rectangular shape.

The uneven portion 114 may be formed such that the convex portion 114a is directed outwardly by applying a pressure to the second main wall 113 from the inside to the outside. That is, when a pressure is applied to the second main wall 113, the connection portion 114c may extend so that the convex portion 114a is directed to the outside of the case 110. Also, similar to a method of applying a pressure to the second main wall 113 but modifying a direction of applying the pressure, when a pressure is applied to the second main wall 113 from the outside to the inside, the connection portion 114c may extend so that the concave portion 114b is directed to the inside of the case 110.

The electrode assembly 130 may include a first electrode layer 131, a second electrode layer 132, and a separator 133 between the first electrode layer 131 and the second electrode layer 132. The electrode assembly 130 may have a structure in which a plurality of first electrode layers 131, second electrode layers 132, and separators 133 are stacked. For example, the electrode assembly 130 may have a jelly-roll structure in which the first electrode layers 131, the second electrode layers 132, and the separators 133 are wound around one another. However, for convenience of description, the description will focus on the electrode assembly 130 having a jelly-roll structure in which the first electrode layers 131, the second electrode layers 132, and the separators 133 are wound around one another.

The first electrode layer 131 may be one of a positive electrode film and a negative electrode film. For example, when the first electrode layer 131 is a positive electrode film, the second electrode layer 132 is a negative electrode film. As another example, when the first electrode layer 131 is a negative electrode film, the second electrode layer 132 is a positive electrode film. That is, the first electrode layer 131 and the second electrode layer 132 have different electrical polarities and are not limited to a predetermined polarity. However, for convenience of description, the first electrode layer 131 formed of a positive electrode film and the second electrode layer 132 formed of a negative electrode film will be described.

The first electrode layer 131 may include a first metal collector (not shown) and a first active material portion (not shown) formed by coating a surface of the first metal collector with a first active material (not shown). Likewise, the second electrode layer 132 may include a second metal collector (not shown) and a second active material portion (not shown) formed by coating a surface of the second metal collector with a second active material (not shown).

As the first electrode layer 131 is a positive electrode film, the first metal collector may be a positive electrode collector, and the first active material portion may be a positive active material portion. Also, as the second electrode layer 132 is a negative electrode film, the second metal collector may be a negative electrode collector, and the second active material portion may be a negative active material portion. The material and structure of the positive electrode collector, the positive electrode active material portion, the negative electrode collector, and the negative electrode active material portion may be well-known materials and structures for secondary batteries in the art, and thus, detailed descriptions of the material and structure will be omitted.

The separator 133 may be a porous polymer layer such as polyethylene film or a polypropylene film, may be in the form of a woven or nonwoven fiber including polymer fibers, may include ceramic particles, and may be formed of a polymer solid electrolyte. For example, the separator 133 may be formed of polyethylene or polypropylene. The separator 133 may be formed of an independent film or may be formed by forming a nonconductive porous layer on the first electrode layer 131 or the second electrode layer 132.

The separator 133 is formed in order to electrically separate the first electrode layer 131 and the second electrode layer 132 from each other, and the form of the separator 133 may not be the same as the form of the first electrode layer 131 or the second electrode layer 132.

A first electrode plate 134 and a second electrode plate 135 having different polarities may be included. The first and second electrode plates 134 and 135 are installed to electrically connect the electrode assembly 130 to an external device. The first electrode plate 134 is electrically connected to the first electrode layer 131 to have a positive polarity, and the second electrode plate 135 is electrically connected to the second electrode layer 132 to have a negative polarity.

The cap plate 150 substantially hermetically seals the opening of the case 110 to protect the electrode assembly 130 installed in the case 110. The cap plate 150 may have the same form as the opening of the case 110. Accordingly, the cap plate 150 may include a first side 155 corresponding to the first main wall 111 and a second side 156 corresponding to the second main wall 113. That is, the cap plate 150 may include the first side 155 that is coupled to the first main wall 111 and the second side 156 that is coupled to the second main wall 113.

An electrode pin 152 may be disposed on the cap plate 150. The first electrode plate 134 may be electrically connected to the cap plate 150, and the second electrode plate 135 may be electrically connected to the electron pin 152. The first electrode plate 134 and the second electrode plate 135 have different polarities, and thus, the cap plate 150 and the electrode pin 152 respectively connected to the first electrode plate 134 and the 135 also have different polarities. For example, the cap plate 150 may have a positive polarity, and the electrode pin 152 may have a negative polarity. Here, in order to prevent a short circuit between the electrode pin 152 and the cap plate 150, a gasket 151 may be included between the electrode pin 152 and the cap plate 150. The gasket 151 can be formed of an insulating material and prevent an electrical short circuit between the electrode pin 152 and the cap plate 150.

An electrolyte solution inlet 154 through which an electrolyte solution is injected into the case 110 that is hermetically sealed may be formed in the cap plate 150. The electrolyte solution inlet 154 may be sealed by using a sealing stopper (not shown) after injecting the electrolyte solution.

Also, an insulation case (not shown), a terminal plate (not shown), and an insulation plate (not shown) may be included between the cap plate 150 and the electrode assembly 130. The insulation case is mounted inside the opening of the case 110 that accommodates the electrode assembly 130. The terminal plate (not shown) is mounted on a surface of the insulation case and is formed of a conductive material to form an electrical path between the electrode pin 152 and the second electrode plate 135. The insulation plate (not shown) prevents an electrical short circuit between the terminal plate and the cap plate 150 by insulating an external surface of the terminal plate.

The cap plate 150 may include an anchor portion 153 to fix the insulation plate and the terminal plate. The anchor portion 153 may fix the insulation plate and the terminal plate to thereby prevent an electrical short circuit.

Figure 2:
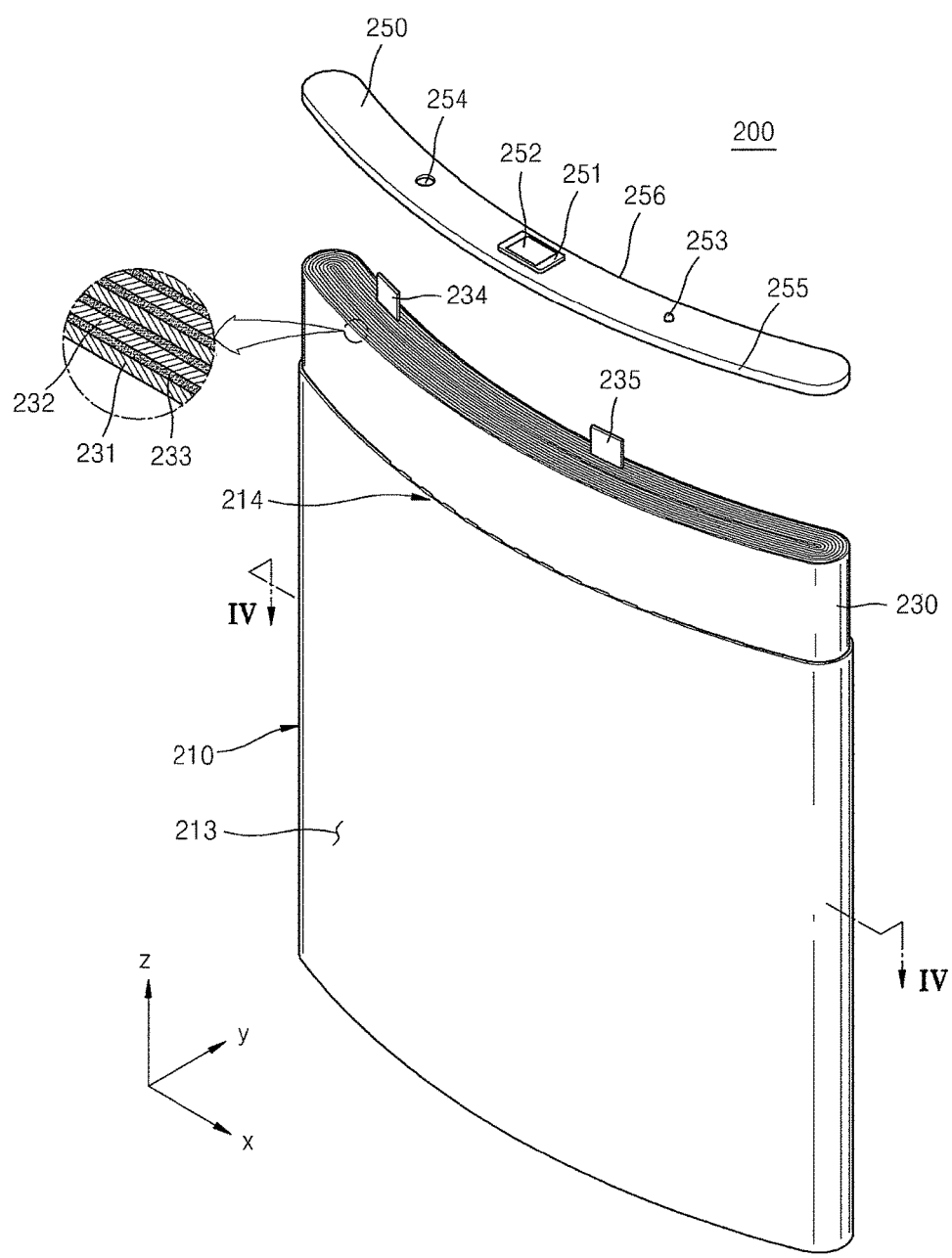
FIG. 2 is an exploded perspective view illustrating a battery pack formed by deforming the battery pack of FIG. 1 by applying a pressure thereto.

Referring to FIG. 2, the battery pack 200 includes a case 210, an electrode assembly 230, a cap plate 250, and an uneven portion 214. However, as the battery pack 200 is a modification example obtained by be curving the battery pack 100 of FIG. 1 by applying a pressure thereto, an external appearance of the battery pack 200 is modified as a shape of the uneven portion 114 is modified as a pressure is applied to the case 110, and the other portions of the battery pack 200 are the same as those of the battery pack 100 of FIG. 1. Accordingly, descriptions not provided in the current embodiment are the same as in the previous embodiment, and the description will focus on the uneven portion 214 and the cap plate 250 which have different external appearances from the previous embodiment.

The battery pack 200 has a predetermined curvature as the first main wall 211 and the second main wall 213 are curved due to expansion and contraction of the uneven portion 214. The battery pack 100 of FIG. 3, which is before deformation, and the battery pack 200 of FIG. 4, which is after deformation, will be compared below.

Referring to the battery pack 100 of FIG. 3 before deformation, unlike the second main wall 113, the first main wall 111 may have a planar surface that does not have an uneven structure. On the other hand, the uneven portion 114 may be formed in the center portion of the second main wall 113.

In detail, in the battery pack 100 before deformation, the convex portion 114a, the concave portion 114b, and the connection portion 114c are formed by applying a pressure to the uneven portion 114, and the connection portion 114c connects the convex portion 114a and the concave portion 114b at a predetermined inclination. Also, thicknesses of the convex portion 114a, the concave portion 114b, and the connection portion 114c are respectively reduced compared to a thickness of the second main wall 113 which is not pressed. In particular, when a pressure is applied to the second main wall 113 from the inside to the outside so that the convex portion 114a is directed to the outside, the thickness of the convex portion 114a may be further reduced.

Figure 4:
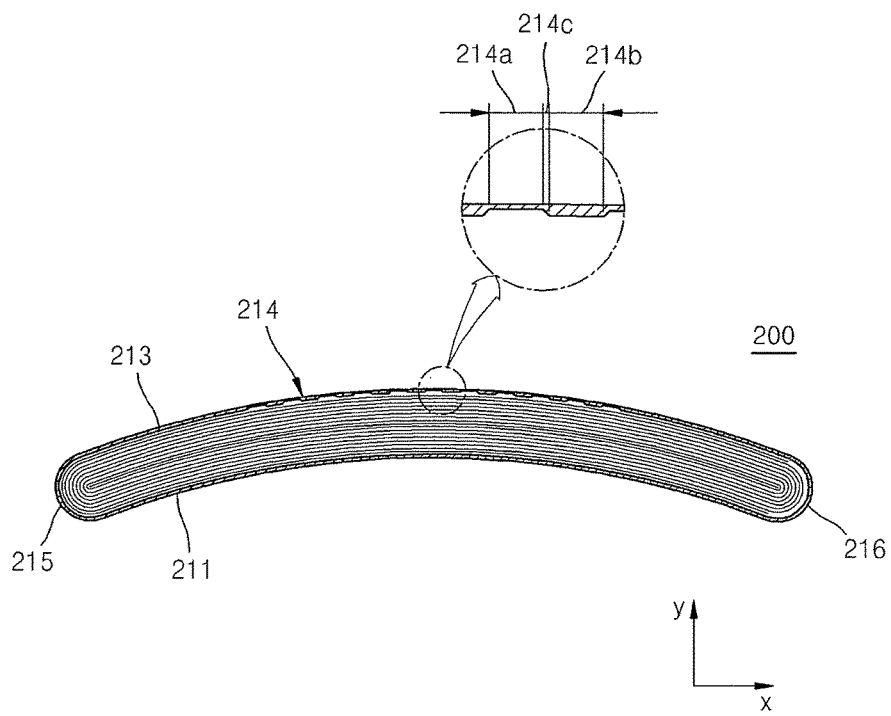
FIG. 4 is a cross-sectional view of the battery pack of FIG. 2 cut along a line IV-IV.

Meanwhile, referring to the deformed battery pack 200 of FIG. 4, the first main wall 211 and the second main wall 213 may be curved to have a predetermined curvature. As illustrated in FIG. 4, the first main wall 211 may be concavely curved, and the second main wall 213 may be convexly curved.

The first main wall 211 that is concavely formed is disposed in an inner portion of the battery pack 200 that is curved, and thus, a center portion of the first main wall 211 of the battery pack 200 after deformation may be thicker than a center portion of the first main wall 111 of the battery pack 100 before deformation.

On the other hand, the second main wall 213 that is convexly formed is disposed in an outer portion of the battery pack 200 that is curved, and thus, the center portion of the first main wall 211 of the battery pack 200 after deformation may be thinner than the center portion of the first main wall 111 of the battery pack 100 before deformation.

In this case, the uneven portion 214 formed in the second main wall 211 may extend in a width direction of the case 210. In detail, the connection portion 214c receives a horizontal tensile force so as to connect the concave portion 214b and the convex portion 214a in a substantially flat manner. The length of an arc of the second main wall 213 may be increased by the thickness of the uneven portion 214 that is reduced during molding. As the length of the arc of the second main wall 213 is increased, the convex portion 114a that is exposed to the outside of the second main wall 113 before deformation is now substantially flat as illustrated in FIG. 4 showing a state after deformation, and the thickness of the convex portion 114a may be reduced by an extension degree thereof. Accordingly, the uneven portion 214 formed in the second main wall 213 may protrude only into the case 210 into which the electrode assembly 230 is inserted.

Accordingly, the length of the first main wall 211 that is concavely formed is reduced by the thickness of the center portion of the first main wall 211 that has increased, and a length of the second main wall 213 is increased by the thickness of the uneven portion 214 formed in the second main wall 213 that is reduced. Thus, the radius of curvature of the second main wall 213 may be greater than the radius of curvature of the first main wall 211.

The radii of curvature of the first main wall 211 and the second main wall 213 are not limited to predetermined curvature values and may be determined according to a user's requirement. For example, a radius of curvature of the second main wall 213 may be about 200 mm or greater so as to provide convenience to a user who uses an electric device (not shown) including the battery pack 200. Also, the difference between the radius of curvature of the first main wall 211 and the radius of curvature of the second main wall 213 may be in the range from about 10 mm to about 30 mm so as to provide a slim battery pack 200. However, depending on the embodiment, the radius of curvature of the second main wall 213 and the radius difference can potentially be outside the above ranges.

When a predetermined curvature is formed in the first main wall 211 and the second main wall 213 of the case 210, the electrode assembly 230 installed in inner space of the case 210 is curved along the first main wall 211 and the second main wall 213. After installing the electrode assembly 230, the electrode assembly 230 may be substantially simultaneously curved with the case 210, or the electrode assembly 230 and the case 210 may be individually curved.

When the case 210 is curved, the cap plate 250 that tightly seals the opening of the case 210 may also be curved along the first main wall 211 and the second main wall 213. The first side 255 of the cap plate 250 connected to the first main wall 211 is formed to have substantially the same curvature as the first main wall 211 such that the first side 255 is connected to the first main wall 211, and the second side 256 of the cap plate 250 is formed to have the same curvature as the second main wall 213 such that the second side 256 is connected to the second main wall 213.

After the cap plate 250 is installed at the opening of the case 210, the cap plate 250 may be substantially simultaneously curved, that is, substantially at the same time, with the case 210 after it is installed at the opening of the case 210. That is, after installing the electrode assembly 230 in the inner space of the case 210, the cap plate 250 and the case 210 may be tightly sealed by welding. Then, by applying a pressure to the first main wall 211 and the second main wall 213, a curvature may be substantially simultaneously formed in each of the electrode assembly 230 and the first side 255 and the second side 256 of the cap plate 250.

Also, after curving the cap plate 250 and the case 210, the cap plate 250 may be inserted into the opening of the case 210 to tightly seal the opening.

In general, a battery pack is formed of a rigid material. Thus, after manufacturing the battery pack, when the battery pack is pressed to form a predetermined curvature therein, cracks may be generated in the battery pack due to limited elongation of the material thereof. In addition, a predetermined curved form of the battery pack may not be maintained when a pressure is applied thereto and a portion of the battery pack may expand in a thickness direction.

According to at least one of the disclosed embodiments, when manufacturing the curved battery packs 100 and 200 by forming the uneven portions 114 and 214, the length of an arc of the second main walls 113 and 213 may be extended to thereby form a curvature in the battery packs 100 and 200 by applying a relatively small force thereto. Thus, the manufacturing process may be performed with a minimum energy. Also, material deformation such as cracks or destruction of the base 110 may be minimized by increasing a length of the arc of the second main wall 113.

Due to operating conditions of a battery pack such as overcharging, overdischarging, an internal short circuit, and overheating, an internal temperature of the case surrounding the external surface of the battery pack may increase, and an internal gas pressure may excessively increase. In this case, swelling of the case 100 occurs. However, according to at least some embodiments, the uneven portions 114 and 214 formed in the cases 110 and 210 are flexible, and thus, a pressure of gas generated in the battery packs 100 and 200 may be distributed to thereby minimize the swelling.

As the battery pack 200 may be deformed when forming a curvature therein according to the form of an electronic device (not shown), spatial utility of the electronic device may be increased.

According to at least one of the disclosed embodiments, durability and safety of a battery pack may be improved.

It should be understood that the exemplary embodiments described therein should be considered in a descriptive sense only and not for purposes of limitation. Descriptions of features or aspects within each embodiment should typically be considered as available for other similar features or aspects in other embodiments.

While the inventive technology has been described with reference to the figures, it will be understood by those of ordinary skill in the art that various changes in form and details may be made therein without departing from the spirit and scope of the present invention as defined by the following claims.

What is claimed is:

1. A battery pack comprising:
   an electrode assembly having an outer side surface, a top and a bottom opposing each other;
   an electrode plate outwardly extending from the top of the electrode assembly;
   a case accommodating the electrode assembly, wherein the case includes first and second walls opposing each other, wherein each of the first and second walls has an inner surface and an outer surface opposing each other, wherein the inner surface faces the outer side surface of the electrode assembly,
   wherein at least a portion of the outer surface of the second wall is uneven, wherein the uneven portion defines a gap between the outer surface of the electrode assembly and the inner surface of the second wall, wherein the uneven portion extends in the width direction of the second wall of the case,
   wherein the uneven portion comprises a plurality of protrusions and a plurality of recesses alternately formed with respect to each other, wherein each of the protrusions extends in the same direction in which the electrode plate extends,
   wherein the outer surface of the second wall is configured to be deformed based on pressure applied to the case, wherein the thickness of each of the protrusions and recesses is configured to decrease by stretching in response to the outer surface of the second wall being deformed,
   wherein each of the first and second walls has a predetermined radius of curvature, and
   wherein the predetermined radius of curvature of the second wall is greater than the predetermined radius of curvature of the first wall.

2. The battery pack of claim 1, wherein the protrusions and recesses are formed in a center portion of the second wall.

3. The battery pack of claim 1, wherein the protrusions and recesses are symmetrical with respect to the center portion of the second wall.

4. The battery pack of claim 1, wherein the thickness of a center portion of the second wall is less than the thickness of a center portion of the first wall.

5. The battery pack of claim 1, wherein each of the first and second walls has a predetermined radius of curvature, and wherein the predetermined radius of curvature of the second wall is about 200 mm or greater.

6. The battery pack of claim 5, wherein the difference between the predetermined radius of curvature of the first wall and the predetermined radius of curvature of the second wall is in the range from about 10 mm to about 30 mm.

7. The battery pack of claim 1, wherein the electrode assembly is curved along the first and second walls.

8. The battery pack of claim 7, further comprising:
a cap plate substantially sealing the electrode assembly inside the case; and
an electrode pin located on an upper surface of the cap plate and electrically connected to the electrode assembly.

9. The battery pack of claim 8, wherein the electrode pin has a first polarity, and wherein the cap plate has a second polarity that is different from the first polarity.

10. The battery pack of claim 9, wherein the cap plate comprises a first side corresponding to the first wall and a second side corresponding to the second wall,
wherein each of the first and second walls has a predetermined radius of curvature, wherein the first side of the cap plate has substantially the same radius of curvature as the first wall, and wherein the second side of the cap plate has substantially the same radius of curvature as the second wall.

11. The battery pack of claim 1, wherein the second wall includes an even portion, and wherein each of the protrusions protrudes from the even portion.

12. The battery pack of claim 1, wherein the protrusions are formed only on the second wall.

13. The battery pack of claim 1, wherein the protrusions are formed only on part of the second wall.

14. The battery pack of claim 1, wherein the length of the second wall is configured to increase in response to the thickness of each of the protrusions and recesses being reduced.

15. The battery pack of claim 1, wherein the thickness of a center portion of the first wall is configured to increase in response to the outer surface of the second wall being deformed, and wherein the length of the first wall is configured to decrease in response to the thickness of the center portion of the first wall being increased.

* * * * *